(12) United States Patent
Scherlen et al.

(10) Patent No.: US 12,742,978 B2
(45) Date of Patent: Sep. 22, 2026

(54) METHOD FOR EVALUATING AT LEAST ONE LIGHT PROTECTION LEVEL OF AT LEAST ONE OPTICAL PRODUCT INTENDED TO FACE AN EYE OF A USER

(71) Applicant: ESSILOR INTERNATIONAL, Charenton-le-Pont (FR)

(72) Inventors: Anne-Catherine Scherlen, Paris (FR); Coralie Barrau, Paris (FR); Olivier Pophillat, Perigny-sur-Yerres (FR); Hélène Maury, Paris (FR); Jean-Philippe Dumont, Paris (FR); Mayara Castillo Llave, Tuam (IE); Cécile Doussinault, Dublin (IE); Camille Ehrismann, Bouchemaine (FR)

(73) Assignee: Essilor International, Charenton-le-Pont (FR)

( * ) Notice: Subject to any disclaimer, the term of this patent is extended or adjusted under 35 U.S.C. 154(b) by 342 days.

(21) Appl. No.: 18/565,679

(22) PCT Filed: May 31, 2021

(86) PCT No.: PCT/IB2021/000401
§ 371 (c)(1),
(2) Date: Nov. 30, 2023

(87) PCT Pub. No.: WO2022/254232
PCT Pub. Date: Dec. 8, 2022

(65) Prior Publication Data

US 2024/0255778 A1 Aug. 1, 2024

(51) Int. Cl.
*G02C 7/02* (2006.01)
*G02C 7/10* (2006.01)
(Continued)

(52) U.S. Cl.
CPC ............. *G02C 7/027* (2013.01); *G02C 7/104* (2013.01); *G02C 13/003* (2013.01); *G01M 11/02* (2013.01)

(58) Field of Classification Search
CPC ...... G02C 7/027; G02C 7/104; G02C 13/003; G01M 11/02; G16H 50/30; G16H 20/40
(Continued)

(56) References Cited

U.S. PATENT DOCUMENTS 5,949,535 A 9/1999 Hall
6,099,126 A * 8/2000 Teskey ..................... A61B 3/06 351/213

(Continued)

FOREIGN PATENT DOCUMENTS

| | | |
|---|---|---|
| EP | 2607884 | 6/2013 |
| EP | 3753475 | 12/2020 |
| WO | WO 2021/102169 | 5/2021 |

OTHER PUBLICATIONS

International Search Report and Written Opinion issued in corresponding PCT Application No. PCT/IB2021/000401, mailed Feb. 28, 2022.

(Continued)

*Primary Examiner* — Tuyen Tra
(74) *Attorney, Agent, or Firm* — Norton Rose Fulbright US LLP

(57) ABSTRACT

The invention provides a method for evaluating at least one light protection level of at least one optical product intended to face an eye of a user, the method comprising the following steps: —determining at least one short-term light protection score representative of at least one short-term light protection attribute, —determining at least one long-term light protection score representative of at least one long-term light protection attribute, evaluating at least one light protection level of at least one optical product based on said at least one (Continued)

short-term and at least one long-term protection scores. The invention also provides an optical product comprising a frame, at least one optical system product attached to said frame and intended to face an eye of a user, a data collecting device and a controller configured to perform said evaluating method.

11 Claims, 5 Drawing Sheets

(51) Int. Cl.
*G02C 13/00* (2006.01)
*G01M 11/02* (2006.01)

(58) Field of Classification Search
USPC .................... 351/41, 159.01, 159.73, 159.74
See application file for complete search history.

(56) References Cited

U.S. PATENT DOCUMENTS

| | | | | |
|---|---|---|---|---|
| 10,448,823 | B2 * | 10/2019 | High ...................... | A61B 3/063 |
| 2008/0046207 | A1 | 2/2008 | Baillet et al. | |
| 2012/0200847 | A1 | 8/2012 | Hall | |
| 2018/0333092 | A1 * | 11/2018 | Roshan ................ | A61B 3/0091 |
| 2019/0212581 | A1 | 7/2019 | Scherlen et al. | |
| 2019/0269315 | A1 | 9/2019 | Lu et al. | |
| 2020/0166780 | A1 | 5/2020 | Dubail et al. | |

OTHER PUBLICATIONS

Office Action issued in corresponding Brazilian Application No. BR112023023915-0, dated Feb. 18, 2026 (English translation).

* cited by examiner

| | | Weighting factors | | | |
|---|---|---|---|---|---|
| | | $X_1$ | $X_2$ | $X_3$ | $X_4$ |
| QUALITY | OPQ Att.1 | $\geqslant V_1$ | $\leqslant V_2$ | $\leqslant V_3$ | $\leqslant V_4$ |
| | OPQ Att.2 | ⋮ | ⋮ | ⋮ | ⋮ |
| | OPQ Att.3 | | | | |
| | OPQ Att.4 | | | | |
| | OPQ Att.5 | | | | |
| | OPQ Att.6 | | | | |

| LIGHT SITUATION | LIGHT PROTECTION ATTRIBUTES | | OP QUALITY ATTRIBUTES |
|---|---|---|---|
| | Short-term | Long-term | |
| Bright light | ST Att. 1, ST Att. 2 | LT Att. 1, LT Att. 2 | OPQ Att. 1, OPQ Att. 2, OPQ Att. 3 |
| Day drive | ST Att. 3, ST Att. 4 | LT Att. 3, LT Att. 4 | OPQ Att. 4, OPQ Att. 5, OPQ Att. 6 |
| Night drive | ST Att. 5, ST Att. 6 | LT Att. 5, LT Att. 6 | OPQ Att. 7, OPQ Att. 8, OPQ Att. 9 |
| Indoor | ST Att. 7, ST Att. 8 | LT Att. 7, LT Att. 8 | OPQ Att. 10, OPQ Att. 11, OPQ Att. 12 |
| Screen at night | ST Att. 9, ST Att. 10 | LT Att. 9, LT Att. 10 | OPQ Att. 13, OPQ Att. 14, OPQ Att. 15 |
| Transitions In-Out | ST Att. 11, ST Att. 12 | LT Att. 11, LT Att. 12 | OPQ Att. 16, OPQ Att. 17, OPQ Att. 18 |
| Transitions Out-In | ST Att. 13, ST Att. 14 | LT Att. 13, LT Att. 14 | OPQ Att. 19, OPQ Att. 20, OPQ Att. 21 |

FIG.3

| LIGHT SITUATION | LIGHT PROTECTION ATTRIBUTES | | | | OPTICAL PRODUCT QUALITY ATTRIBUTES | | |
|---|---|---|---|---|---|---|---|
| | Short-term | | Long-term | | | | |
| Bright light | ST Att. 1 | ST Att. 2 | LT Att. 1 | LT Att. 2 | OPQ Att. 1 | OPQ Att. 2 | OPQ Att. 3 |
| | x% | x% | x% | x% | x% | x% | x% |
| Day drive | ST Att. 3 | ST Att. 4 | LT Att. 3 | LT Att. 4 | OPQ Att. 4 | OPQ Att. 5 | OPQ Att. 6 |
| | x% | x% | x% | x% | x% | x% | x% |
| Night drive | ST Att. 5 | ST Att. 6 | LT Att. 5 | LT Att. 6 | OPQ Att. 7 | OPQ Att. 8 | OPQ Att. 9 |
| | x% | x% | x% | x% | x% | x% | x% |
| Indoor | ST Att. 7 | ST Att. 8 | LT Att. 7 | LT Att. 8 | OPQ Att. 10 | OPQ Att. 11 | OPQ Att. 12 |
| | x% | x% | x% | x% | x% | x% | x% |
| Screen at night | ST Att. 9 | ST Att. 10 | LT Att. 9 | LT Att. 10 | OPQ Att. 13 | OPQ Att. 14 | OPQ Att. 15 |
| | x% | x% | x% | x% | x% | x% | x% |
| Transitions In-Out | ST Att. 11 | ST Att. 12 | LT Att. 11 | LT Att. 12 | OPQ Att. 16 | OPQ Att. 17 | OPQ Att. 18 |
| | x% | x% | | | | | |
| Transitions Out-In | ST Att. 13 | ST Att. 14 | LT Att. 13 | LT Att. 14 | OPQ Att. 19 | OPQ Att. 20 | OPQ Att. 21 |
| | x% | x% | x% | x% | x% | x% | x% |

FIG.4

| | DATA | OP1 | OP2 | OP3 | OP4 | OP5 | OP6 | OP7 | OP8 | OP9 | OP10 | OP11 | OP12 | OP13 | OP14 | OP15 |
|---|---|---|---|---|---|---|---|---|---|---|---|---|---|---|---|---|
| 12, 16 | Tv (23+35 average) | 19 | 20.75 | 18.6 | 14 | 89.13 | 97.35 | 88.2 | 94.48 | 87.93 | 96.6 | 96.1 | 15.36 | 17.45 | 18.13 | 15.57 |
| | PE | 0 | 0 | 90 | 0 | 0 | 0 | 0 | 0 | 0 | 0 | 0 | 0 | 0 | 99 | 99 |
| | BVC | 87 | 86 | 90 | 87 | 14.49 | 8.65 | 27.3 | 24.03 | 31 | 22 | 25.4 | 87.68 | 86.79 | 81.8 | 84.75 |
| | E-SPF | 16 | 40 | 46 | 43 | 15 | 35 | 15 | 52 | 15 | 50 | 50 | 16 | 100 | 100 | 82 |
| 24 | Rv | 5.18 | 0.69 | 0.64 | 0.68 | 5.39 | 0.8 | >5 | 0.65 | 5.36 | 0.65 | | 5.36 | 1.18 | 1.38 | 1.42 |
| | Haze | 0.15 | 0.14 | 0.58 | 0.16 | 0.09 | 0.01 | | 0.09 | 0.12 | 0.1 | | 0.08 | 0.11 | 0.1 | 0.14 |
| | b* | 6.62 | 4.45 | 7.47 | 8.06 | 0.82 | 2.22 | 28 | 3.95 | 3.49 | 2.9 | 4.8 | -10.87 | -9.37 | -1.9 | -5.34 |
| | | | | | | | | | | | | | | | | |
| | SCORING ATTRIBUTES | | | | | | | | | | | | | | | |
| 10 | Tv | 2.82 | 2.58 | 2.88 | 3.62 | 0.08 | 0.06 | 0.09 | 0.06 | 0.09 | 0.06 | 0.06 | 3.38 | 3.04 | 2.94 | 3.35 |
| | PE | 0 | 0 | 4 | 0 | 0 | 0 | 0 | 0 | 0 | 0 | 0 | 0 | 0 | 4 | 4 |
| 14 | BVC | 4 | 4 | 4 | 4 | 1 | 0 | 2 | 2 | 2 | 2 | 2 | 4 | 4 | 4 | 4 |
| | E-SPF | 2 | 3 | 3 | 3 | 1 | 3 | 1 | 4 | 1 | 4 | 4 | 1 | 4 | 4 | 4 |
| 22 | Rv | 0.5 | 1 | 1 | 1 | 0.5 | 1 | 0.5 | 1 | 0.5 | 1 | 1 | 0.5 | 0.9 | 0.9 | 0.9 |
| | Haze | 1 | 1 | 1 | 1 | 1 | 1 | 1 | 1 | 1 | 1 | 1 | 1 | 1 | 1 | 1 |
| | b* | 0.9 | 1 | 0.9 | 0.9 | 1 | 1 | 1 | 1 | 1 | 1 | | | | | |

Fig. 5

| | OP1 | OP2 | OP3 | OP4 | OP5 | OP6 | OP7 | OP8 | OP9 | OP10 | OP11 | OP12 | OP13 | OP14 | OP15 |
|---|---|---|---|---|---|---|---|---|---|---|---|---|---|---|---|
| 10 SHORT | 0.5 | 0.5 | 0.8 | 0.7 | 0.0 | 0.0 | 0.0 | 0.0 | 0.0 | 0.0 | 0.0 | 0.6 | 0.6 | 0.8 | 0.9 |
| 14 LONG | 0.8 | 0.9 | 0.9 | 0.9 | 0.3 | 0.4 | 0.4 | 0.8 | 0.4 | 0.8 | 0.8 | 0.6 | 1.0 | 1.0 | 1.0 |
| 22 Vision experience factor | 0.75 | 1 | 1 | 1 | 0.83 | 1.00 | 0.83 | 1.00 | 0.83 | 0.9 | 0.9 | 0.75 | 0.95 | 0.95 | 0.95 |
| 26 ST * VE | 0.40 | 0.48 | 0.79 | 0.68 | 0.01 | 0.01 | 0.01 | 0.01 | 0.01 | 0.01 | 0.01 | 0.48 | 0.54 | 0.76 | 0.83 |
| 20 LPS(ST+VE)*LT | 0.57 | 0.68 | 0.83 | 0.78 | 0.13 | 0.19 | 0.19 | 0.38 | 0.19 | 0.38 | 0.38 | 0.55 | 0.77 | 1.88 | 0.92 |

METHOD FOR EVALUATING AT LEAST ONE LIGHT PROTECTION LEVEL OF AT LEAST ONE OPTICAL PRODUCT INTENDED TO FACE AN EYE OF A USER

CROSS-REFERENCE TO RELATED APPLICATIONS

This application is a national phase application under 35 U.S.C. § 371 of International Application No. PCT/IB2021/000401 filed 31 May 2021. The entire contents of the above-referenced disclosure is specifically incorporated by reference herein without disclaimer.

The present invention generally relates to the field of light sensitivity.

It more particularly relates to a method for evaluating at least one light protection level of at least one optical product intended to face an eye of a user.

It also relates to a computer system and a computer program product comprising code instructions for performing said method.

It further relates to an optical product comprising a frame and at least one optical system.

It has been observed that most people, close to 9/10 people, experience sensitivity to light. It can be a sensation of discomfort, headache, pain, dazzling, or fatigue. It is a visual discomfort which can occur in many lighting conditions, notably in lighting conditions specific for a given user, as well as in indoor and outdoor situations (natural & artificial light).

Evaluating light protection of an optical product, as for example a lens for a pair of glasses, is generally performed considering short-term or long-term protection.

Short-term protection refers to the visual experience and comfort of the user in a given light situation. Short-term protection is most commonly evaluated by eye-care professionals (ECP) relative to the luminous transmittance of the lens.

Long-term protection refers to the impact of light on eye health. Said long-term protection can be evaluated relative to exposure to blue-violet radiation or ultraviolet radiations.

It is known to evaluate light protection level of a lens based on UV protection or luminous transmittance (e.g. categories 0, 1, 2, 3 and 4 for sunglasses). It allows to quantify light protection level of a lens from a specific evaluation angle.

It is however difficult with this kind of evaluation to evaluate the light protection level of a lens in a global way. Indeed, a user experiences various light environments having different light conditions. Every day, and all day long, a user is constantly bathed in lights, from the sun to our screens. Light environment is not static, it constantly changes over time and highly depends on our activities. Hence, it is difficult to provide a relevant evaluation to an eye-care professional (ECP) or a user with this kind of evaluation.

A problem that the invention aims to solve is thus to provide a method for evaluating light protection level of an optical product in a more detailed and relevant manner.

To solve this problem, the invention provides method for evaluating at least one light protection level of at least one optical product intended to face an eye of a user, the method comprising the following steps:

- determining at least one short-term light protection score representative of at least one short-term light protection attribute of said at least one optical product,

- determining at least one long-term light protection score representative of at least one long-term light protection attribute of said at least one optical product,
- evaluating at least one light protection level of at least one optical product based on said at least one short-term and at least one long-term protection scores.

The light protection level is thus evaluated considering both short-term and long-term protections to allow a more complete evaluation. The combination of short-term and long-term protections allows to make the light protection level more relevant to much more light environments and conditions. It better reflects the light protection level of the optical product in a holistic and ecological approach.

It is thus easier for an ECP or a user to determine which optical product is adapted to the user's light protection needs.

According to an embodiment of said evaluating method, it further comprises:

- determining at least one light environment,
- selecting said at least one short-term light protection attribute and said at least one long-term light protection attribute respectively among a group of short-term light protection attributes and a group of long-term light protection attributes, depending on said at least one determined light environment.

According to an embodiment of said evaluating method, said at least one light environment are selected within a group of light environments, said group of light environments comprises at least one among a bright light environment, a day drive environment, a night drive environment, an indoor environment, a screen at night environment, an in-to-out transition environment and an out-to-in transition environment.

According to an embodiment of said evaluating method, said at least one short-term and/or said at least one long-term light protection scores are determined using different weightings for said at least one short-term and said at least one long-term light protection attributes, respectively.

According to an embodiment of said evaluating method, it further comprises:

- determining at least one vision experience score representative of at least one optical product quality attribute of said at least one optical product,
- determining at least one global short-term light protection score based on said at least one short-term light protection score and said at least one vision experience score,
- wherein said at least one light protection level of said at least one optical product is evaluated based on said at least one global short-term light protection score and said at least one long-term light protection score.

According to an embodiment of said evaluating method, the step of evaluating at least one protection level comprises a step of determining at least one global light protection score of said at least one optical product based on said at least one short-term and at least one long-term light protection scores.

According to an embodiment of said evaluating method, it further comprises:

- determining at least two light environments,
- wherein at least one short-term, at least one long-term and at least one global light protection scores are determined for each determined light environment.

According to an embodiment of said evaluating method, it further comprises the step of determining a light protection evaluation score based on each global light protection score determined for a determined light environment, wherein said light protection evaluation score is determined using different weightings for said global light protection scores depending on the at least two determined light environments.

According to an embodiment of said evaluating method, said global light protection score is determined using different weightings for said at least one global short-term and said at least one long-term light protection scores.

According to an embodiment of said evaluating method, said at least one short-term light protection attribute is one among a transmission attribute, a polarization attribute, a straylight discomfort attribute and a spectral attribute.

For short term light protection, a transmission attribute may be luminous transmittance (Tv) or speed of transmission variation (darkening processes or fading processes). A polarization attribute may be polarizing efficiency (PE). A straylight attribute may be multi-angular reflection efficiency (Rv, Rs). A spectral attribute may be blue radiation filtering.

According to an embodiment of said evaluating method, said at least one long-term attribute is a spectral attribute.

For long-term light protection, a spectral attribute may be an ultraviolet protection, blue-violet radiation protection or infrared radiation protection.

According to an embodiment of said evaluating method, said at least one optical product quality attribute is one among a transmission attribute, a straylight attribute and a color perception residual attribute.

For vision experience light protection, a transmission attribute may be luminous transmittance (Tv). A straylight attribute may be multi-angular reflection efficiency (Rv, Rs), ghost image transmission (Tgi) or a haze. A color perception residual attribute may be color saturation (chroma) or yellowness (b*).

According to and embodiment of said evaluating method, said optical product may comprise a frame attached to an optical system, frame attributes related to said frame being considered to evaluate said light protection level. Said frame attributes may be used when determining either said short-term light protection score, said long-term light protection score, said vision experience light protection score or for at least two of these.

Frame attribute may be wrap of the frame, size/thickness/shape of the frame, material and transparency of the frame or face coverage rate by the optical product (frame and/or lenses).

According to an embodiment of said evaluating method, it further comprises:

- determining at least one light protection need of a user,
- determining at least one optical product for the user based on said at least one light protection level and said at least one light protection need of the user.

According to an embodiment of said evaluating method, it further comprises a step of displaying said at least one short-term and said at least one light protection scores onto a same graphic having a first and a second dimensions, said at least one short-term light protection being positioned relative to said first dimension and said at least one long-term light protection being positioned relative to said second dimension.

According to an embodiment of said evaluating method, said method is a computer-implemented method.

The invention further relates to an optical product comprising a frame and at least one optical system attached to said frame and intended to face an eye of a user, said optical product comprising a data collecting device and a controller configured to perform a method for evaluating at least one light protection level of said at least one optical product, the method comprising the following steps:

- determining at least one short-term light protection score representative of at least one short-term light protection attribute of said at least one optical product,
- determining at least one long-term light protection score representative of at least one long-term light protection attribute of said at least one optical product,
- evaluating at least one light protection level of said at least one optical product based on said at least one short-term and at least one long-term protection scores.

The invention is described in more detail below by way of the figures that show only one preferred embodiment of the invention.

FIG. 3 shows a table gathering an example of short-term light protection, long-term light protection and optical product quality attributes considered to determine a light protection level according to said method of FIG. 1 for each selected light environment.

FIG. 4 shows a table gathering an example of weighting factors applied to short-term light protection, long-term light protection and optical product quality attributes for each selected light environment.

FIG. 5 shows a table gathering technical values and associated scores of short-term light protection, long-term light protection and optical product quality attributes for a given light environment for a plurality of optical products.

Figures 1, 2:
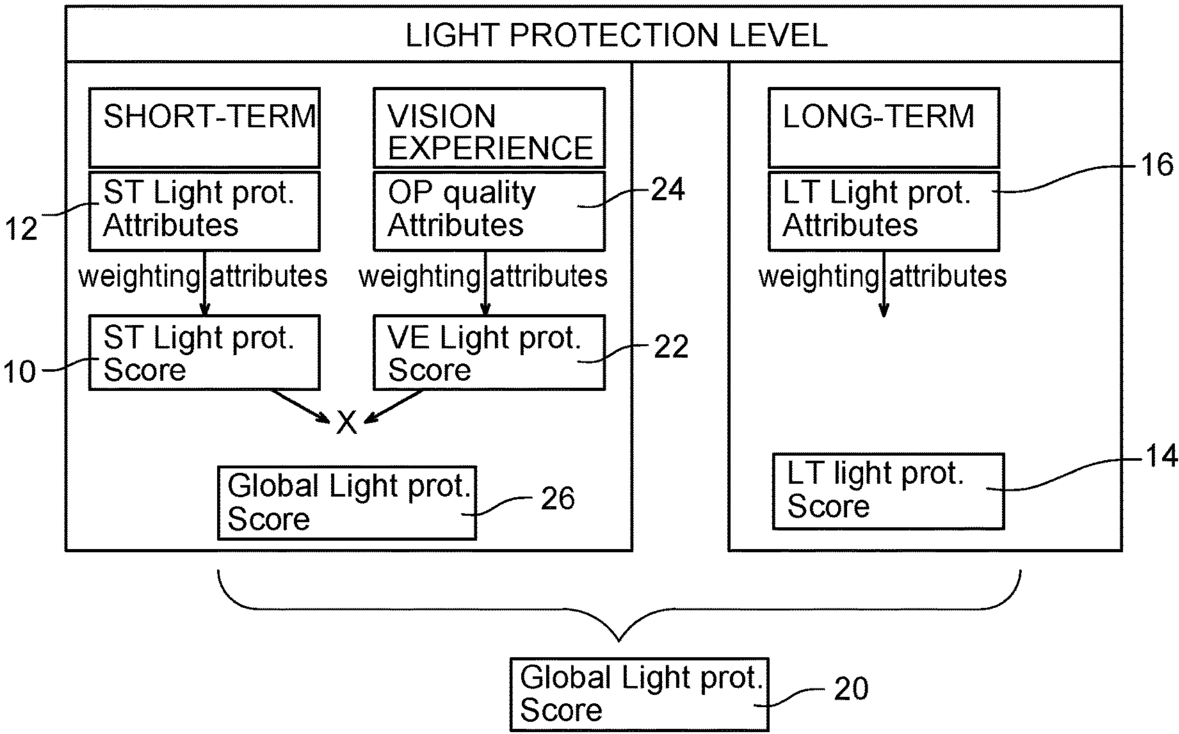
FIG. 1 shows a flowchart of a method according to the invention evaluating a light protection level of an optical product.
FIG. 2 shows a table gathering weighting factors of optical product quality attributes used in the evaluating method of FIG. 1.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms “comprise” (and any grammatical variation thereof, such as “comprises” and “comprising”), “have” (and any grammatical variation thereof, such as “has” and “having”), “contain” (and any grammatical variation thereof, such as “contains” and “containing”), and “include” (and any grammatical variation thereof such as “includes” and “including”) are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements but is not limited to possessing only those one or more steps or elements.

The present invention provides a method for evaluating at least one light protection level of at least one optical product intended to face an eye of a user.

An optical product according to the disclosure comprises at least one ophthalmic lens or optical filter or optical glass or optical material suitable for human vision, e.g. at least one ophthalmic lens, or optical filter, or optical film each comprising a substrate, or patch intended to be fixed on a substrate, or optical glass, or optical material intended for use in an ophthalmic instrument, for example for determining the visual acuity and/or the refraction of a subject, or any kind of safety device including a safety glass or safety wall intended to face an individual's eye, such as a protective device, for instance safety lenses or a mask or shield.

The optical product may be implemented as eyewear equipment having a frame that surrounds at least partially one or more ophthalmic lenses. By way of non-limiting example, the optical product may be a pair of glasses, sunglasses, safety goggles, sports goggles, a contact lens, an intraocular implant, an active lens with an amplitude modulation such as a polarized lens, or with a phase modulation such as an auto-focus lens, etc.

Herein, the term "lens" means an organic or inorganic glass lens, comprising a lens substrate, which may be coated with one or more coatings of various natures.

The term "ophthalmic lens" is used to mean a lens adapted to a spectacle frame, for example to protect the eye and/or correct the sight. Said lens can be chosen from afocal, unifocal, bifocal, trifocal and progressive lenses. Although ophthalmic optics is a preferred field of the invention, it will be understood that this invention can be applied to optical products of other types, such as, for example, lenses for optical instruments, in photography or astronomy, optical sighting lenses, ocular visors, optics of lighting systems, safety lenses, etc.

The at least one ophthalmic lens or optical glass or optical material suitable for human vision can provide an optical function to the user i.e. the wearer of the lens.

It can for instance be a corrective lens, namely, a power lens of the spherical, cylindrical and/or addition type for an ametropic user, for treating myopia, hypermetropia, astigmatism and/or presbyopia. The lens can have a constant power, so that it provides power as a single vision lens would do, or it can be a progressive lens having variable power.

As used herein, a base material or substrate has at least one face, i.e. a surface on one side, coated with an interferential multilayer coating providing asymmetric mirror properties.

Said base material can constitute the substrate of a lens, filter, glass, ophthalmic material etc as cited above, or can constitute the main part of a patch intended to be fixed on such substrate to provide it with asymmetric mirror properties.

The base material or substrate may also have an opposite face coated, i.e. a surface on the other side, also coated, so that, in such a case, two faces of the optical product opposite to one another may be coated.

When the base material constitutes a substrate of an ophthalmic lens, its front face is preferably coated with an antireflective or mirror coating, and its rear face preferably coated with an antireflective coating.

When the base material constitutes the main part of a patch intended to be fixed on a substrate of an ophthalmic lens, its front face is preferably coated with an antireflective or mirror coating, and its rear face will be prepared so as to be fixed on said substrate, that will be provided with an antireflective coating on its rear face.

As used herein, the rear face of the base material or the substrate is intended to mean the face which, when using the product, is the nearest from the wearer's eye, in the cases of ophthalmic lenses. It is generally a concave face. On the contrary, the front face of the substrate is the face which, when using the product, is the most distant from the wearer's eye. It is generally a convex face. The optical product can also be a planar product.

The substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, preferably polythiourethane resins having a refractive index of 1.60 or 1.67, polyepoxides, polyepisulfides, such as those having a refractive index of 1.74, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC), diethylene glycol bis (allylcarbonate) polymers and substrates obtained from thermosetting polythiourethane resins, which are marketed by the Mitsui Toatsu Chemicals company as MR series, in particular MR6®, MR7® and MR8® resins. The latter substrates as well as the monomers used for their preparation are especially described in the U.S. Pat. Nos. 4,689,387, 4,775,733, 5,059,673, 5,087,758 and 5,191,055.

An interferential coating can be associated either by coating or by lamination, to a clear base material/substrate, i.e., a base material/substrate having a visible light mean transmission factor Tv higher than 96%, or any other base material/substrate (including non clear ones), and define with the latter an optical article having a visible light mean transmission factor Tv preferably ranging from 96% to 4%, more preferably from 90% to 4%. In most cases, the resulting optical article is a colored optical article.

The Tv factor, also called relative light transmission factor in the visible spectrum, relative visible light mean transmission factor or "luminous transmission" of the system, is such as defined in the standard NF EN 1836 and relates to an average in the 380-780 nm wavelength range that is weighted according to the sensitivity of the human eye at each wavelength of the range and measured under D65 illumination conditions (daylight).

As such, the interferential coating according to the invention can be tailored so as to define, with the associated substrate, different tints of sunglasses with different visible light mean transmission factors Tv:

- above 80%,
- from 43 to 80% (known as sunglasses of category or class 1),
- from 18 to 43% (known as sunglasses of class 2),
- from 8 to 18% (known as sunglasses of class 3),
- below 8% (known as sunglasses of class 4).

Said optical product may comprise a photochromic lens, an electrochromic lens, a clear lens, a blue cut function lens or a sun lens.

By "electrochromic lens", we mean a lens comprising electroactive substances which are simultaneously oxidized and reduced in contact with feed electrodes. At least some of these electroactive substances have colors that are different between their oxidized and reduced forms. The system thus changes color and/or presents a variable light absorption when an electric control that is applied between the feed electrodes is itself varied.

By "photochromic lens", we mean an ophthalmic article defined by, but not exclusive of corrective lenses, non-corrective lenses, contact lenses, intraocular lenses, magnifying lenses, protective lenses, and visors containing photochromic compounds within a coating, the lens material, a film, or any adjacent layer. Photochromic compounds undergo a transformation from one state (or form) to another state in response to certain wavelengths of electromagnetic radiation (i.e., "actinic radiation"). Each state has a characteristic absorption spectrum. For example, many photochromic compounds transform from an unactivated (e.g., bleached or substantially colorless) state to an activated (e.g., tinted) state upon exposure to actinic radiation. When the actinic radiation is removed, the photochromic compounds reversibly transform from the activated state back to the unactivated state.

Non-limiting examples of suitable organic photochromic compounds can include benzopyrans, naphthopyrans (for example naphtho[1,2-b]pyrans and naphtho[2,1-b]pyrans) spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57 and in U.S. Pat. No. 5,658,501 at column 1, line 64 to column 13, line 36, which disclosures are incorporated herein by reference. Additional non-limiting examples of organic photochromic compounds that may be used include oxazines, such as benzoxazines, naphthoxazines, and spirooxazines. Other non-limiting examples of photochromic compounds that may be used include: fulgides and fulgimides, for example 3-furyl and 3-thienyl fulgides and fulgimides, which are described in U.S. Pat. No. 4,931,220 at column 20, line 5 through column 21, line 38, which disclosure is incorporated herein by reference; diarylethenes, which are described in U.S. Patent Application Publication No. 2003/0174560 from paragraph to [0086], which disclosure is incorporated herein by reference; and combinations of any of the aforementioned photochromic compounds. For example, the photochromic material (a) can comprise a compound selected from the group consisting of naphthopyrans, benzopyrans, phenanthropyrans, indenonaphthopyrans, spiro(indoline) naphthoxazines, spiro(indoline)pyridobenzoxazines, spiro (benzindoline)pyridobenzoxazines, spiro(benzindoline) naphthoxazines, spiro(indoline) benzoxazines, fulgides, fulgimides, and mixtures thereof.

Short-Term Light Protection Attributes

As shown on FIG. 1, the present evaluating method first comprises a step of determining a short-term light protection score 10 representative of at least one short-term light protection attribute 12 of said at least one optical product.

A short-term light protection score 10 refers to the ability of an optical product to improve comfort and light resistance during a light exposure. A short-term light protection attribute 12 thus refers to a structural, physicochemical or optical characteristic or parameter of the optical product which has an impact and comfort and light resistance during this light exposure.

Short-term light protection attributes 12 may be chosen among luminous transmittance (Tv), Speed of transmission variation (clear to dark, i.e. darkening process, and dark to clear, i.e. fading process), polarizing efficiency (PE), multi-angular reflection efficiency (Rv, Rs), blue radiation filtering in the peak emission range of LED-based digital devices ("CUT_LED", between 380 and 500 nm, preferably between 430 and 470 nm, most preferably between 440 and 460 nm).

Luminous transmittance (Tv) is the optical product transmission perceived by the observer under specified solar radiation (%). Luminous transmittance is preferably considered as a short-term attribute for natural light environments, as a bright light and day drive environment. In this kind of light environment, the quantity of light experienced by the user is at an important level. Since luminous transmittance refers to the quantity of light which provided to the user's light through the optical product, luminous transmittance is therefore an attribute which is considered as improving short-term light protection in a bright light environment. It is defined by the mean transmittance value of a lens in the visible range 380-780 nm weighted by the irradiance solar radiation (D65) and the photopic visibility function (V lambda). The principle is to measure the spectral transmission of the optical product at reference point at normal incidence using a spectrometer. On photochromic lenses, Tv corresponds to luminous transmittance at three different states:

- Darkened/Activated state (Tv out): The photochromic lens is activated for 15 minutes in a two 150 W Xenon arc lamp optical bench with a 50:50 beam splitter and the irradiance through a KG2 filter providing UVA/VIS, and the second beam having a KG2 filter and GG400 filter resulting in only supplemental VIS to provide 50 klux VIS and 6.7 $W/m^2$ UVA. A Zeiss M601 spectrophotometer then measures the Tv after 15 minutes of activation at 23° C. and 35° C. Tv out is therefore the resulting average Tv of the lens in a bright light environment.
- Behind the Windshield/In car state (Tv bws): This a measurement that mimics the performance of photochromic lenses behind the windshield of a car. The photochromic lens is conditioned to achieve full unactivated state by 5 minutes activation with 365 nm ultraviolet lamp followed by heating to 70° C. and exposure to yellow fluorescent lamp for 25 minutes followed by storage in the dark for at least 1 hour. Then the lens is activated using one 150 W lamp on the A-BMP with a KG2 filter and a windshield filter in place and the irradiance adjusted to 1.0 $W/m^2$ integrated between 380-420 nm, 1.7 klux while at 27° C. The windshield glass consisted of a 2 plates of 2.3 mm Solar green glass with Solutia-UV enhanced polyvinylbutyrate as the laminate. The Tv bws after 15 minutes activation is then measured.
- Clear/Faded state (Tv in): The clear/faded state follows the ISO 8980-3 procedure as to what a clear/faded photochromic lens is. To measure Tv in the photochromic lens is conditioned as explained in the section concerning Tvbws above, and then Tv in is read using a Hunter UltraScan Pro, which refers to the spectral weighted transmittance associated with the vision of the eye under well-lit conditions and defined by the 1931 CIE photopic luminosity function.

Speed of transmission variation corresponds to a criterion applicable in dynamic situations only (i.e. from indoor to outdoor or opposite). Speed corresponds to activation speed for in-to-out situations and fade speed for out-to-in situations.

For an in-to-out situation, the test method consists of measuring the time of the lenses to reach 90% of the difference in transmission (Tv in−(0.9*(Tv in−Tv out))). For an in-to-out situation, this test method consists of measuring the time of the lenses to reach 70% of Tv in (0.7*Tv in). For an in-to-out situation, said test method is defined in a new standard ISO 12312-1 (standard in progress at the time of filing).

Said polarizing efficiency (PE) is the efficiency calculation (%) according to the lens luminous transmittance measured in two cross positions under polarizing light. Principle is to measure the lens luminous transmittance (Tv with D65 source) with linear polarizing light in two positions: Lens polarizing axis (if exists) in parallel position (Tvpar) then perpendicular (Tvper) to the polarized light source. This requires implementing a linear polarizer at the output of the light source on the spectrometer. Test method is detailed in ISO 8980-3. ISO 8980-3 and ISO12312-1 specify the minimum value on polarizing efficiency to claim a lens as having polarizing function: Peff shall be not lower than 60% for lens in category 1 and Peff shall be not lower than 78% for lens in category 2, 3 or 4.

Said multi-angular reflection efficiency (Rv, Rs) is a criterion quantifying the overall anti-reflective efficiency whatever the light direction. Said multi-angular reflection efficiency (Rv, Rs) is preferably considered as a short-term attribute for light environments with artificial light, as night drive, indoor and screen at night environments. In this kind of light environment, a major part of light exposition is punctual light sources and peripheral light sources. Multi-angular reflection efficiency is an attribute which is considered as improving short-term light protection of the user in these light environments.

Said multi-angular reflection efficiency may be expressed as an integral of the Rv in an angular range, for example [0°-45° ]. In a more general way, the global efficiency a of an antireflection treatment on an optical surface for angles of incidence ranging from 0° to θmax can be quantified by the following parameter:

The lowest the coefficient α, the lowest the global reflection phenomena.

$$\alpha = K\int_0^{\theta max} Rv(\theta)\sin\theta d\theta$$

For comparison of performances of antireflective coatings over various domains of incident angles, coefficient α is normalized with numeric constant K so as to have a coefficient α equal to 1% for a model Rv(θ) function being constant and equal to 1%. K depends only on θmax and is defined by the following equation:

By this way, the performance of a lens over the range [0°-40° ] can be $$\frac{1}{K} = \int_0^{\theta max} \sin\theta d\theta$$

compared to another lens over the range [0°-50° ].

An approximate value of coefficient α may be computed by several simplifications. As Rv(θ) presents several domains for θ in which Rv is almost constant, one can define coefficient α by the following equation:

$$\frac{\alpha}{K} \approx \widehat{Rv1}\int_0^{\theta 1} \sin\theta d\theta + \widehat{Rv2}\int_{\theta 1}^{\theta max} \sin\theta d\theta$$

where Rv 1^ is the average value of Rv over the range 0° to θ1 and Rv 2^ is the average value of Rv over the range θ1 to θmax.

θ1 is selected so as to separate a domain of low incident angles and a domain of high incident angles including θmin. In particular, θ1 can be selected in the range of 15° to 40°.

With this definition, the two integrals of approximate coefficient α are purely geometric and can be computed exactly, and are renormalized with numeric constant K so as to have a coefficient α equal to 1% for a model Rv(0) function being constant and equal to 1%.

In particular, θmax is higher than 35°, preferably higher than 40°. In some embodiments, θmax is higher than 45°, even better higher than 50°. The largest θmax, the more incident light is integrated in the coefficient α.

The global efficiency of an antireflection treatment on a substrate having two opposed surfaces, such as an optical lens, for angles of incidence ranging from 0° to θmax can be quantified by the following parameter:

$$\alpha 2 = K2\left(\int_0^{\theta max} Rv^{front}(\theta)\sin\theta d\theta + \int_0^{\theta max} Rv^{rear}(\theta)\sin\theta\, d\theta\right)$$

In which Rvfront (θ) represents the mean light reflection factor for the front main face of the substrate and Rvrear (θ) represents the mean light reflection factor for the rear main face of the substrate for an angle of incidence θ.

Approximate values for coefficient α2 may be computed in a similar manner as for coefficient α. In particular, numeric constant K2 is computed so as to have a coefficient α2 equal to 1% for model functions Rvfront (θ) and Rvrear (θ) being constant and equal to 1%.

In a specific embodiment, θmax is set to 45°, θ1 is set to 25°, Rv 1^ is set to Rv(15°) for front and rear faces, Rv 2^ is set to Rv(35°) for front and rear faces and the resulting formula for coefficient α2 is the following, the computing of which is detailed in the experimental part:

$$\alpha 2 = 0.159.\left(R_v^{front}(15°) + R_v^{rear}(15°)\right) + 0.341.\left(R_v^{front}(35°) + R_v^{rear}(35°)\right),$$

This parameter is particularly meaningful as it takes into account both low and high angles of incidence.

Low α or α2 values indicate a high multiangular efficiency of an antireflection treatment. The parameter α2 of the present optical lens is preferably lower than or equal to 0.7, more preferably lower than or equal to 0.6, even better lower than or equal to 0.55. Such a high level of multiangular efficiency of the antireflection property is attained by optical lenses having on both main faces an antireflection coating according to the invention.

The parameter α of an antireflection coating according to the invention is preferably lower than or equal to any one of the following values: 0.85, 0.75, 0.70, 0.60, 0.50, and 0.40.

An antireflection coating on the front face of the lens preferably has an a parameter lower than or equal to 0.85, more preferably lower than or equal to 0.75, even better lower than or equal to 0.70, 0.60, or 0.50. An antireflection coating on the front face of the lens preferably has an a parameter lower than or equal to 0.70, more preferably lower than or equal to 0.60, even better lower than or equal to 0.50, and much better lower than or equal to 0.40.

The "mean light reflection factor," noted Rv, also called "luminous reflection", is such as defined in the ISO 13666: 1998 standard, and measured in accordance with the ISO 8980-4 standard (for an angle of incidence lower than 17°, typically of 15°), i.e., this is the weighted spectral reflection average over the whole visible spectrum between 380 and 780 nm. It may be measured for all incidence angles q, thus defining a function Rv(q).

The mean light reflection factor Rv may be defined by the following equation:

$$R_V = \frac{\int_{380}^{780} R(\lambda)\cdot V(\lambda)\cdot D_{65}(\lambda)\cdot d\lambda}{\int_{380}^{780} V(\lambda)\cdot D_{65}(\lambda)\cdot d\lambda}$$

where R(λ) is the reflectance at a wavelength λ, V(λ) is the eye sensitivity function in the color space defined by the CIE (Commission on Illumination, in French "Commission Internationale de l'Eclairage") in 1931 and D65(λ) is the daylight illuminant defined in the CIE S005/E-1998 standard.

The illuminant can be adapted according to the light situation. For instance, a derived Rv function may be defined for indoor light situations using LED illuminant rather than the usual D65.

The mean light reflection factor Rv of a highly reflective coating or "mirror" coating is higher than 2.5%. The mean light reflection factor Rv of an anti-reflection coating according to the invention is preferably lower than or equal to 2.5%, more preferably lower than or equal to 2% or 1%, even more preferably ≤0.85%.

Characterizing the blue-violet radiation filtering performance of a lens, associated with long-term protection, is done by calculating a weighted average cut over the blue-violet radiation from 400 to 455 nm, which corresponds to the harmful part of blue radiation as defined in ISO TR20772:2018 and in several peer-reviewed papers (Marie et al., Cell Death and Disease, 2020), (Marie et al., Cell Death and Disease, 2018), (Arnault, Barrau et al., 2013):

$$BVC(B') = 100\% - \frac{\int_{400nm}^{455nm} B'(\lambda)\cdot T(\lambda)\cdot d\lambda}{\int_{400nm}^{455nm} B'(\lambda)\cdot d\lambda} \text{ or}$$

$$BVC(B) = 100\% - \frac{\int_{400nm}^{455nm} B(\lambda)\cdot T(\lambda)\cdot d\lambda}{\int_{400nm}^{455nm} B(\lambda)\cdot d\lambda}$$

where

T(λ): Transmittance (%)

B'(λ): Refined blue radiation hazard function defined in the peer-reviewed paper (Arnault et al., PlosOne, 2013) and consistent with the ISO definition of harmful blue radiation from 400 to 455 nm (ISO TR 20772:2018).

B(λ): Blue radiation hazard function (ISO 8980-3: Annex B), much broader than the refined B', proposed in the 1970s by ICNIRP.

The way we calculate BVC and Tv are similar: for both, we weight the spectral transmittance of the lens by a biological function. For BVC, this is the blue hazard function for the retina B' and for TV, this is the photopic visual sensitivity function of the eye (V).

Beyond its impact on cumulative damage to the retina, blue radiation favors discomfort glare (Bullough, 2009) and may promote symptoms of visual fatigue, as it scatters more in the eye. In that sense, for short-term light protection, comfort is notably calculated by weighting the spectral transmittance of the lens over the whole blue range from 380 to 500 nm with the spectral emission of a reference LED spectrum (CIE 015:2018) (Alexander Kokka et al 2018 Metrologia 55 526) representative of LED-based digital screens emission. The spectral range can be limited to 430-470 nm in some embodiments, or even from 440 to 460 nm, as the peak emission is around 450 nm.

Filtering in that range may also provide increased visual performance due to increased contrast sensitivity.

In order to quantify the cutting of short wavelengths i.e. blue light coming for example from car LED headlights, a parameter called the light cut factor CutLED can be used. CutLED is defined as follows:

$$\text{Cut LED} = 100 - \frac{\int_{\lambda=380}^{500} * T(\lambda) * \text{LED emission}(\lambda)}{\int_{\lambda=380}^{500} \text{LED emission}(\lambda)}$$

where Σ is a discrete or continuous i.e. integral sum operator, λ is the wavelength in nm, lens T % is the spectral transmittance of the lens in % and LED emission is the spectral distribution of a white light emitting diode. As the light cut factor is a weighted function of the light source, the exact type of light source is not relevant, as soon as the main emission peak of the light source is located in a range of wavelengths between 430 nm and 480 nm, in particular between 440 nm and 465 nm.

The calculated CutLED is also indicative of the capability of filtering the solar light as the solar spectrum also comprises a high level of emission in the 430 nm-480 nm range.

In an embodiment, LED emission is defined in % in the Cut LED formula above.

Said short-term light protection score 10 may be determined with only one short-term attribute 12 or with a combination of a plurality of short-term attributes 12.

To determine the short-term light protection score 10 from the short-term light protection attributes 12, a discrete score is determined, for instance from 0 to 4, depending on the technical values and relative to normative recommendations or standards or tests on the field. For the luminous transmittance, a continuous score may be used to be more precise in the protection level brought by the optical product.

For a bright light environment, the luminous transmittance (Tv) ranges are defined according to the above-presented standards. The higher score being assigned to the lower range Tv values. Concerning the polarization efficiency, a first threshold value is given at 78% (ISO standards). The second one at 95% is defined from our internal knowledge enabling us to discriminate product performance. Two threshold values (1 and 0.5%) for the haze are also based on internal R&D studies. The 1% value corresponds to a discomfort felt by the wearer and the 0.5% to an aesthetic threshold. In the same way for the Rv, the first threshold value at 2.5% is given by the ISO standards and the second one at 5% is defined from our internal knowledge enabling us to discriminate product performance.

For an indoor office light environment, the luminous transmittance (Tv) ranges are also defined according to the standards presented in the previous section. But the higher score is assigned to the higher range Tv values. The same features and explanation provided for a bright light environment applies here for the indoor office light with regard to a and Rv values.

Long-Term Light Protection Attributes

Said method then comprises a step of determining at least one long-term light protection score 14 representative of at least one long-term light protection attribute 16 of said at least one optical product.

A long-term light protection score refers to eye health. It thus refers to the ability of the optical product to limit the negative impact of light on eye health.

Long-term attributes may be chosen among blue radiation filtering ("CUT_LED", especially between 400 and 455 nm), ultraviolet radiation protection (between 100 and 380 nm) and infrared radiation protection (between 780 and 1400 nm). All the short-term attributes referring to the frame may also be considered as long-term attributes because they may have an impact on eye health.

For long-term light protection, blue cut function is preferably between 400 and 455 nm (see BVC(B') and BVC(B) equations above).

Said ultraviolet radiation protection corresponds to the ability of the optical product to reduce transmission from the front-side of the lens and reflection from the back-side of the lens in the UVA and UVB radiation ranges (respectively 315-380 nm and 280-315 nm), so as to allow the best health protection against UV radiations.

It is advisable for a spectacle wearer to wear before each of both eyes an ophthalmic lens that strongly reduces reflection on the rear face in the UVA- and UVB-radiation ranges, which may be harmful to the anterior part of the eye (cornea and crystalline lens).

Reflecting UV light is not really problematic on the front face of the lens, since the major part of the UV radiation which comes from the front of the wearer and might attain the wearer's eye (normal incidence, 0 to 15°) generally gets absorbed by the ophthalmic lens substrate. On the other hand, the UV radiation resulting from light sources located behind the wearer may reflect on the lens rear face and reach the wearer's eye if the lens is not provided with an antireflective coating which is efficient in the ultraviolet region, thus potentially affecting the wearer's health. It is admitted that the light rays that may reflect onto the lens rear face and reach the wearer's eye have a narrow incidence angle range, ranging from 30 to 45° (oblique incidence).

In this regard, the antireflection coating on the rear main face of the optical lens, and optionally the antireflection coating on its front main face, which exhibit very good antireflective performances in the visible region, are preferably at the same time capable of significantly reducing the UV radiation reflection, especially ultraviolet A- and ultraviolet B-rays, as compared to a bare substrate or to a substrate comprising a traditional antireflective coating that is only efficient in the visible region.

The mean reflection factor RUV on the rear main face between 280 nm and 380 nm, weighted by the function W(λ) defined in the ISO 13666:1998 standard, is preferably lower than 5%, preferably lower than 4.5%, more preferably lower than or equal to 4%, even better lower than or equal to 3% for an angle of incidence of 35°. In another embodiment, the mean reflection factor RUV on the rear main face between 280 nm and 380 nm, weighted by the function W(λ) defined in the ISO 13666:1998 standard, is preferably lower than 5% for both an angle of incidence of 30° and for an angle of incidence of 45°. Said mean reflection factor RUV is defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein R(λ) represents the lens spectral reflection factor at a given wavelength, and W(λ) represents a weighting function equal to the product of the solar spectrum irradiance Es(λ) and the efficiency relative spectral function S(λ). In certain embodiments, this factor may be measured at an angle of incidence that ranges from 30° to 45° on the rear face.

The spectral function W(λ), enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy Es(λ) into account, which does globally emit less UVB-rays as compared to UVA-rays, and the spectral efficiency S(λ), UVB-rays being more harmful than UVA-rays. The values for those three functions in the ultraviolet region are given in the table disclosed in ISO 13666:1998 Standard (which is reproduced at page 6 of the publication WO 2012/076714).

The above anti-UV performances are provided by the antireflection coating while maintaining low Rv factors for a wide range of angles of incidence.

When the optical product is spectacles, UV protection may also be defined using an ESPF index. The document EP 2 607 884 proposes to calculate said ESPF index that quantifies the overall reduction of ultraviolet radiation achieved by the spectacles in question and combines to do this a value of transmission through the spectacles and a value of reflection from the back face of the spectacles.

The ESPF index thus calculated makes an objective approach to evaluation of the protection from ultraviolet radiation provided by various spectacles possible. Indeed, when it is sought to protect the eyes of a wearer from ultraviolet radiation by means of spectacles, it is necessary to take into account not only radiation transmitted through the eyeglasses of these spectacles, but also rays reflected from the back face of these eyeglasses.

Said long-term light protection score 14 may be determined with only one long-term attribute 16 or with a combination of a plurality of long-term attributes 16.

At least one light protection level 18 of at least one optical product is then evaluated based on said at least one short-term 10 and at least one long-term 12 protection scores.

Beyond their ability to bring visual correction, optical lenses can thus be characterized by a large set of technical attributes that contribute differently to the modulation of light.

Said light protection level allows to evaluate an optical product considering the combination of short-term and long-term attributes to better reflect the ability of the optical product to provide comfort and light resistance as well as reduce negative impact of light on eye health.

Said light protection level may be used by displaying said at least one short-term 10 and said at least one long-term 14 light protection scores onto a same graphic or area. In other words, said short-term 10 and long-term 14 light protection scores may be used as components of the light protection level to help distinguishing how the light protection level is composed. For instance, said at least one short-term 10 and said at least one long-term 14 light protection scores may be displayed such that said at least one short-term light protection score 10 is positioned relative to said first dimension and said at least one long-term light protection score 14 is positioned relative to said second dimension, on a same graphic. Said first and second dimensions may be axes of a rectangular coordinate system, as shown on FIG. 8 wherein a light protection level of an optical product is positioned relative to x-axis coordinate (short-term) and y-axis coordinate (long-term).

Optical Product Quality Attributes

As shown on FIG. 1, said method may also comprise a step of determining at least one vision experience score 22 representative of at least one optical product quality attribute 24 of said at least one optical product. At least one global short-term light protection score 26 is then determined based on said at least one short-term light protection score 10 and said at least one vision experience score 22. Said at least one light protection level or global light protection score 20 of said at least one optical product are then evaluated based on said at least one global short-term light protection score 26 and said at least one long-term light protection score 14.

A vision experience light protection score 22 refers to characteristics of the optical product which could degrade the comfort and light resistance of the user, as for example with poor quality lenses. This vision experience light protection score acts therefore as a weighting of the short-term light protection score 10. Preferably, said vision experience light protection score 22 is a weighting factor which is below 1. Said vision experience light protection score 22 is therefore only able to lower the short-term light protection score 10.

For each optical product quality attribute, a score between 0.5 and 1, more preferably 0.8 and 1, may be applied according to the technical values.

Optical product quality attributes 24 may be chosen among at least transmission of ghost image (Tgi), luminous transmittance (Tv), multi-angular efficiency criterion (Rv, Rs), ghost image transmission (Tgi), haze, color saturation (chroma) and yellowness (b*).

Luminous transmittance is preferably considered as an optical product quality attribute for light environments with artificial light, as night drive, indoor and screen at night environments. In this kind of light environment, a major part of light exposition is punctual light sources and peripheral light sources. As indicated above, luminous transmittance refers to a quantity of light experienced by the user is at an important level. Luminous transmittance is therefore an attribute which is considered as reducing vision experience of the user if this attribute is too high. That is why luminous transmittance is considered as an optical product quality attribute in this kind of light environment.

Multi-angular efficiency criterion (Rv, Rs) is preferably considered as an optical product quality attribute for natural light environments, as a bright light and day drive environment. In this kind of light environment, the quantity of light experienced by the user is at an important level.

Said transmission of ghost image (Tgi) is an appropriate colorimetric for evaluating ghost image intensity and visibility as defined in the European Patent Application no 20306264.1. This ghost image is generated by an internal reflection inside the lens. It can be calculated using the photopic visibility function. This parameter may be based on the calculation of the ghost image spectrum and also includes the spectrum of the light source and the CIE 1964 observer which is found to be more relevant than the conventional CIE 1931 observer.

To calculate colorimetric parameters, in a first step, we use the transmittance spectrum of the ghost image. The transmittance spectrum enables to obtain descriptive information on the ghost image color. We derive therefrom a numerical parameter describing and evaluating ghost images concisely and accurately.

A numeric simulation tool has been developed on Matlab to calculate the transmittance spectrum of the ghost image. The transmittance spectrum of the ghost image can also be calculated on the Macleod software vStack function (available with Macleod Enhanced Edition).

The numeric simulation is based on the following assumptions:

approximation of two parallel surfaces (lens correction not accounted), substrate absorption and thickness is taken into account, calculation made with an incidence angle of 15 degrees.

The incidence angle is set at 15 degrees to represent an average observation angle. However, any non-null incidence angle, preferably between 5 and 30 degrees, can be used if necessary to match more particular sets of conditions.

The color of the ghost image is calculated using the transmittance of the ghost image in the 380-780 nm spectral range.

The reference illuminant selected here is for example, the reference illuminant is a LED having a color temperature comprised between 2700 Kelvin and 6000 Kelvin, in particular a 4000K LED, or any point source such as a filament lamp, a halogen lamp, or even the sun (as disclosed therein, a point light source is a light source which appears small compared to the field of view of the observer through the lens. For example, the angular size of the source is more than 5-10 times smaller than the total field of view of the observer.

Color is calculated with the following tools: the necessary color calculation functions have been implemented on Matlab (also available as a commercial toolbox), and Macleod has a built-in color calculation function.

In the CIE XYZ color coordinates system, the RV of an anti-reflection coating corresponds to the Y tristimulus value (the value representing luminance) calculated from the reflectance of the anti-reflection with the 2 degrees observer (CIE 1931 observer). TGI is herein defined as the Y tristimulus value of the ghost image transmittance, calculated instead with the 10 degrees observer (or CIE 1964 observer). The 10 degrees observer is an updated version of the 2 degrees observer, providing corrections in the blue wavelength range, and is the CIE recommendation for color calculation. Like the RV, TGI is expressed in %. In other words, TGI corresponds to a colorimetric parameter representing the luminance of the color of the ghost image based on the human eye sensitivity from CIE 1964 photopic observer and based on the spectrum of a point source illuminant (instead of D65 standard reference).

The transmission of ghost image, or ghost image transmission coefficient, denoted TGI, for two-surfaces optical system is calculated by the following expression (I):

$$T_{G1}(15°) = 100\frac{\int_{380}^{780} S(\lambda)T(\lambda, 15°)\overline{y}_{10}(\lambda)d\lambda}{\int_{380}^{780} S(\lambda)\overline{y}_{10}(\lambda)d\lambda}$$

where S(λ) represents the spectrum of the light source depending on the wavelength λ in the visible spectral range between 380 nm and 780 nm, T(λ, 15°) the ghost image transmittance depending on the wavelength λ for an incidence angle of 15 degrees, and is the spectral light efficiency for a CIE 1964 photopic observer (also known as '10° observer').

The ghost image transmittance for a two-surface optical system is calculated using the following expression (II):

$$T(\lambda, 15°) = T_{Cx}(\lambda, 15°)\cdot R_{BCe}(\lambda, \alpha)\cdot R_{BCx}(\lambda, \alpha)\cdot T_{Ce}(\lambda, \alpha)\cdot(T_{int}(\lambda, \alpha))^3$$

where TCx(λ, 15°) represents the spectral transmission of the incident light beam through the first (convex) surface for an incidence angle of 15 degrees depending on the wavelength λ, RBCc(λ, a) represents the spectral reflection of the light beam on the second (concave) surface 12 for a reflection occurring from the inside of the substrate medium for a refraction angle a depending on the wavelength λ, RBCx(λ, a) represents the spectral reflection of the light beam on the first (convex) surface for a reflection occurring from the inside of the substrate medium for the refraction angle a depending on the wavelength λ, TCc(λ, a) represents the spectral transmission of the light beam through the second (concave) surface for a transmission occurring from the substrate medium to the air for a refraction angle a depending on the wavelength λ, and Tint(λ, a) represents the spectral transmission of the light beam through the substrate supporting the first and second surfaces for the refraction angle a depending on the wavelength λ.

For the incidence angle of 15 degrees, the refraction angle a derives from the Snell-Descartes formula:

$$n_{air}\sin(15°) = n_{substrate}\sin(\alpha)$$

where nair is the refractive index of air, and nsubstrate is the refractive index of the lens substrate.

In the case of an optical system with two-surfaces, we have determined a numerical threshold for ghost image visibility of 0,007%. In other words, in the case N=2, the numerical threshold of ghost image visibility is identified as TGI=0.007%.

Using the above formula TGI(15°), the coatings on the first and second surfaces can be optimized so as to obtain a transmission of ghost image that is below the numerical threshold value of ghost image visibility of 0.007%.

FIG. 2 shows an example of vision experience light protection scores 22 or weighting factors correspondence to optical product quality attributes. For instance, a weighting factor of 0.8 may be applied to the short-term light protection score 10 when haze is above 1. In this example, said global light protection score 26 is determined as the product between said vision experience light protection scores 22 and said short-term light protection score 10.

Global Light Protection Score

Said evaluation of at least one protection level may also comprise a step of determining at least one global light protection score 20 of said at least one optical product. Said at least one global light protection score 20 is determined based on said at least one short-term 10 and at least one long-term 14 light protection scores. It allows the ECP or the user to have a single score to evaluate the light protection level of an optical product representative of both short and long-term light protection.

According to a preferred embodiment, said global light protection score 20 is calculated using the following equation.

$$\text{GLOBAL LIGHT PROTECTION SCORE} = \text{Average}((ST\text{ light }prot.\text{ score} * VE\text{ light }prot.\text{ score}); LT\text{ light }prot.\text{ score})$$

With

1. $ST\text{ light }prot.\text{ score} = (\text{Attributes\_1} * \text{Weight\_1} + \text{Attributes\_2} * \text{Weight\_2})/4$
2. $VE\text{ light }prot.\text{ score} = \text{Attributes\_1} * \text{Weight\_1} + \text{Attributes\_2} * \text{Weight\_2} + \text{Attributes\_3} * \text{Weight\_3}$
3. $LT\text{ light }prot.\text{ score} = (\text{Attributes\_1} * \text{Weight\_1} + \text{Attributes\_2} * \text{Weight\_2})/4$ Light Environments In a most preferred embodiment, said method comprises a step of determining at least one light environment which is considered as annoying in terms of light conditions. Said light environments may be chosen among a list of predetermined light environments or determined depending on the user habits and usage.

In a first embodiment where light environments are determined according to the user, the light components of said light environment may be modulated according to the light conditions which are most commonly experienced by the user or considered by the user as being the most annoying light conditions. Alternatively, said light environments may be determined using a measurement device positioned onto the user. Said measurement device may be worn by the user during a period of time which allows to measure different light environments encountered by the user and better define said light environment. Said measurement device may be integrated within said optical product to update said light environment over time.

In a second embodiment where light environments are chosen among a list of light environments, said at least one light environment is preferably chosen among a bright light environment, a day drive environment, a night drive environment, an indoor environment, a screen at night environment, an in-to-out transition environment and an out-to-in transition environment. These seven light environments have been identified, frequently described as annoying (Transitions, Light Experience Quiz, 22,660 respondents), representative of our daily lives with five static indoor or outdoor conditions and 2 transitions.

Said bright light environment may correspond to an outdoor situation representing a wearer walking in an openview area, on a bright sunny day. Said light environment is characterized by high intensity levels and punctual light reflection (sea, building reflection, . . . ), ultraviolet radiation and blue radiation exposure. In this light environment, people find themselves needing to close their eyes or squint when exposed to harsh sunlight that is too intense compared to their retinal resistance. If the exposure is brief, an adaptation to the luminous flux occurs. Whereas if it is prolonged, there will be saturation of the retinal processes and blinding glare will be experienced.

Said day drive environment corresponds to an outdoor situation representing a wearer driving on a bright sunny day.

Said night drive environment corresponds to outdoor situation representing a wearer driving at night without road lighting. Vehicle headlights can result in discomfort and/or disabling glare at night. Headlights are a focal or point-like source of artificial light—the smaller the size, the more visual discomfort they will produce, and the closer they are the more disabling they will be. Individuals suffering from discomfort/disability glare while driving will transition from low light levels (nighttime) to a sudden peak of light intensity (headlights). The variation of comfort and vision will depend on the luminous intensity before the stimulation.

Said indoor environment may correspond to an indoor situation representing a wearer working on her/his computer in a daylit office. There is a high correlation between the luminance of a glare source (i.e. intensity) and the degree of discomfort. Discomforting glare perception also depends on the spatial situation of the observer in relation to the glare source. Furthermore, the more peripheral the position of the glare source, the lesser the perceived discomfort. There is also a rising concern that LED based light sources may cause more glare since they possess the characteristics of high surface luminance, small emitting size, and special spectral power distribution due to its peculiar emitting principle. Computer screens, LEDs, smartphones, and a whole array of connected devices have all had an impact on our everyday lives. Both exposure time and proximity to the source impact the visual discomfort (Coles-Brenann et al., 2019).

Said in-to-out and out-to-in transition environments correspond to transitions from indoor to outdoor and from outdoor to indoor, respectively. If a user goes from the outdoors on a bright sunny day into a dimly lit room, said user is hardly able to see our surroundings at first. As time goes by, however, said user gradually recovers his vision. This phenomenon is known as “dark adaptation”, or the ability of the eye to become more visually sensitive after remaining in darkness for a period of time. On the other hand, light adaptation occurs when a user moves from the dark into bright light. The bright light momentarily dazzles said user and all he sees is white light because the sensitivity of the receptors is set to dim light. In both scenarios, time is needed to regain comfort and a good visual performance. This time is dependent on several factors, including the light level before the light variation and the significance of the light jump (sudden intensity variation). The retina takes longer to adapt again to low light flux, in those cases we often refer to the term “vision recovery.

Said method may then comprise a step of selecting at least one short-term light protection attribute 12 and at least one long-term light protection attribute 16 depending on said at least one light environment. In other words, short-term and long-term light protection attributes may be specifically chosen relative to the light environment which has been determined. The same applies to optical product quality attributes which may be selected depending on the light environment.

FIG. 3 shows an example of a determination of the attributes depending on the seven light environments considered to be the most annoying. “ST Att. X” refer to short-term light protection attributes 12, “LT Att. X” refer to long-term light protection attributes 16 and “OPQ Att. X” refer to optical product quality attributes 24. These attributes are differently numbered for the sake of clarity but different attributes may refer to the same attribute. For instance, “ST Att. 1” and “ST Att. 3” may be the same attribute, e.g. the luminous transmittance (Tv). Attributes from different categories (short-term, long-term and vision experience) may also refer to a same attribute. As an example, “LT Att. 7” and “OPQ Att. 1” may be the same attribute, e.g. the multi-angular reflection efficiency (Rs, Rv).

Luminous transmittance (Tv) and polarizing efficiency (PE) may be chosen as short-term attributes when considering a bright light environment. Blue radiation filtering (BVC(B')) may preferably be considered as the unique long-term light protection attribute for night drive, indoor and screen at night environments, as UV are not emitted or do not reach the eye in such light situations.

According to a preferred embodiment, at least two light environments are considered to evaluate the light protection level of the optical product. Most preferably, each of said seven abovementioned light environments are considered for such an evaluation.

In this preferred embodiment, each of the light protection scores are determined for each light environment. In other words, at least one short-term 10, at least one long-term 14 and at least one global 20 light protection scores are determined for each determined light environment. A vision experience light protection score 22 is also determined for each light environment when such a score is determined. This preferred embodiment is for example illustrated on FIG. 3 wherein each light environment refers to specific short-term 10, long-term 14 and vision experience 22 light protection scores.

This embodiment is particularly relevant because the needs for protection are significantly different from one light environment to the other, which makes it more realistic to provide one score per light environment.

Weightings

In a first aspect, as shown on FIG. 4, each attribute among short-term 12 and long-term 16 light protection attributes and optical product quality attributes 24 may be weighted when determining one or more among short-term 10 and long-term 14 light protection scores and vision experience light protection score 22. For instance, polarizing efficiency (here ST Att. 2) and luminous transmittance (here ST Att. 1) may respectively consist in 25% and 75% of the short-term light protection score 10 when considering a day drive environment. As another example, multi-angular reflection efficiency (Rv), haze and color saturation (Chroma) may be equally considered when calculating the vision experience light protection score 22 for a bright light environment.

In a second aspect, a light protection evaluation score (not shown) may be determined based on each global light protection score determined for a determined light environment. Said light protection evaluation score may be determined using different weightings for said global light protection scores depending on the light environments which are considered. It allows to weight one or more light environments with respect to the other. It is particularly useful to provide such a weighting when the user is more exposed to certain environments than others or for a specific use.

In a third aspect, said global light protection score 20 may be determined using different weightings for said at least one global short-term 26 and said at least one long-term 14 light protection scores. This allows to focus the evaluation of the optical product on short-term or long-term protection while considering both of these protections.

Said evaluating method may further comprise a step of determining at least one light protection need of a user. Said light protection need may comprise one or more of at least one physiological and/or optometric parameter, at least one light exposure profile, at least one user's preference, at least one posture and eye/head behavior of the user and user's activities and associated visual and cognitive requirement.

Said physiological and/or optometric parameter may comprise age, light sensitivity level, ametropia (type and value), visual or non visual diseases (ARMD, Glaucoma, . . . ) and pupil behavior.

Said light exposure profile may comprise time exposure to the light, mapping of light environment and previous light exposure.

Said posture and eye/head behavior of the user may comprise head/eye position face to the light sources may also be considered (head down, straight ahead, etc.).

Said user's activities and associated visual and cognitive requirement may comprise posture and vision performance/comfort of the user that can vary according to the activities (computer work, driving, walking, gaming) for which the position of the user's head/eyes will determine different luminous radiation.

At least one optical product may be then determined for the user based on said at least one light protection level and said at least one light protection need of the user. In other words, at least one optical product may be identified as matching the light protection needs of the user.

When said optical product comprises a frame attached to an optical system, frame attributes related to said frame may be considered to evaluate said light protection level. Said frame attributes may be used when determining either said short-term light protection score, said long-term light protection score, said vision experience light protection score or for at least two of these. In other words, one or more of short-term light protection attributes, long-term light protection attributes and optical product quality attributes may comprise frame attributes.

Frame attribute may be wrap of the frame, size/thickness/shape of the frame, material and transparency of the frame or face coverage rate by the optical product (frame and/or lenses).

Said frame attributes correspond to the ability of the frame to influence light protection of the user. Indeed, said frame forms a structural obstacle to light exposition of the user's eye. Frame attributes may have an impact on light protection for each of short-term light protection, long-term light protection and vision experience. Indeed, when considering short-term and long-term protection, said frame allows to limit the light exposure of the wearer's eyes and therefore reduces discomfort and UV/IR radiations exposure. In view of short-term and long-term light protection, the more the frame covers the eyes, the more positive said frame is. To the contrary, when said frame has an important covering ability, vision experience of the user is reduced. That is why frame attributes may be evaluated positively for short-term and long-term light protections but negatively for vision experience light protection.

Example

Figures 6, 7:
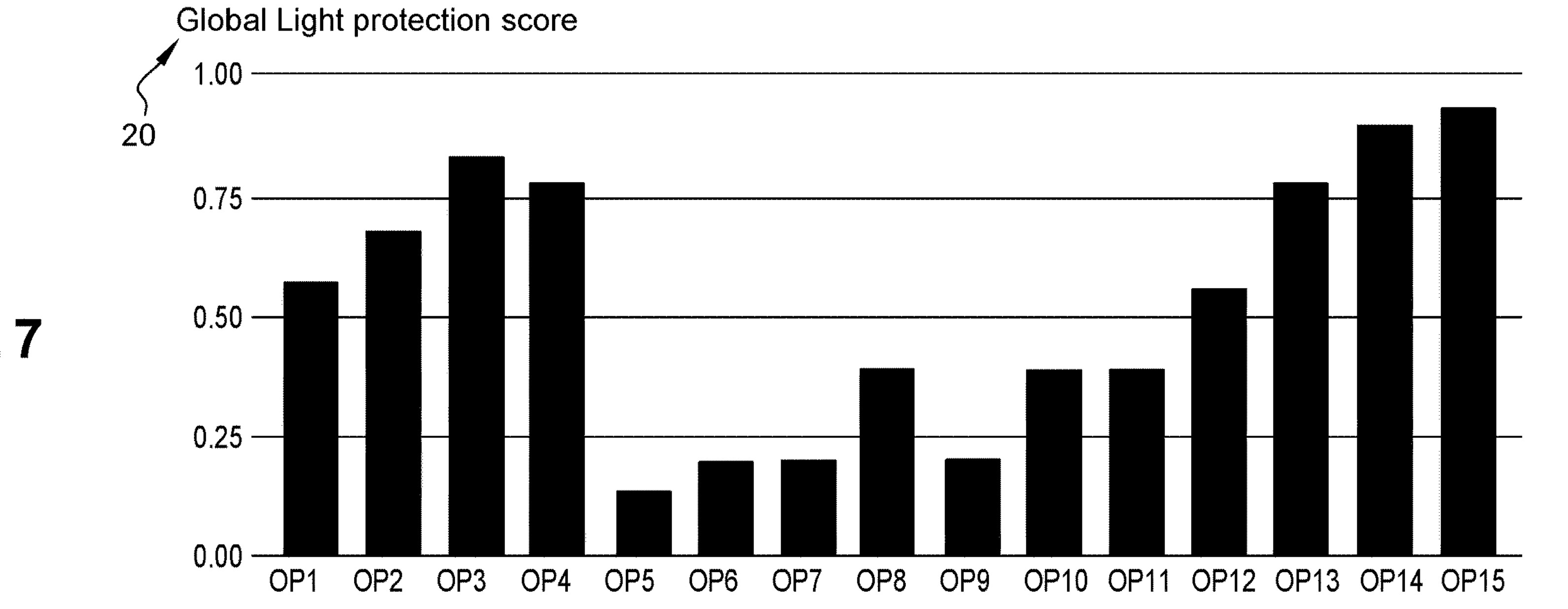
FIG. 6 shows a table gathering short-term light protection score, long-term light protection score, vision experience light protection score, global short-term light protection score and global light protection score for each of the optical products of FIG. 5.
FIG. 7 shows a graph illustrating the global light protection score of each of the optical products of FIGS. 5 and 6.

As shown on FIGS. 5 and 6, light protection level may be evaluated for a plurality of optical product to allow comparison between these optical products.

In this example, the light environment which is considered is a bright light environment with:

Two dominant attributes selected for the SHORT TERM PROTECTION: Tv & PE, with weights: 0.75 (TV) & 0.25 (PE)

Two dominant attributes selected for the LONG TERM PROTECTION: BVCb' & Espf, with weights: 0.50; 0.50

Three dominant attributes selected for VISION EXPERIENCE: Rv, Haze, b*, with weights: 1/3; 1/3; 1/3

Here, 15 filters have been measured based on these selected attributes.

For each filter, each technical attribute is measured and reported in the table below (DATA). Then, attributes are scored based on the ranges defined above between 0 and 4 for ST and LT light protection and between 0.5 and 1 for vision experience.

FIG. 5 shows a table gathering all the short-term 12 and long-term 16 light protection attributes as well as the optical product quality attributes 24 in the first upper portion of the table. Said table also gathers in the second lower portion of the table all the scores corresponding to the short-term 12 and long-term 16 light protection attributes as well as the optical product quality attributes 24.

FIG. 6 then shows a table gathering all the short-term light protection score 10, long-term light protection score 14, the vision experience light protection score 22, the global short-term light protection score 26 and the global light protection score 20 for each evaluated optical product, for a given light environment.

Global light protection score 20 of FIG. 6 are then displayed in a graphic on FIG. 7 for each optical product.

Figure 8:
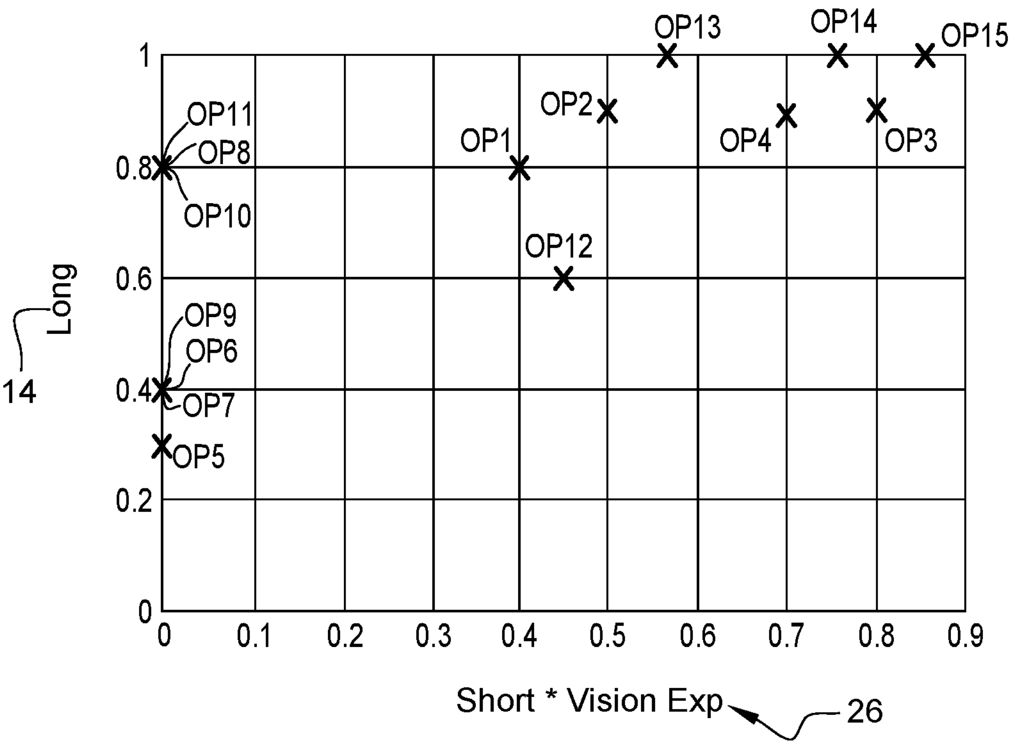
FIG. 8 shows a graph wherein each optical product of FIGS. 5 and 6 is represented by a point having a X-axis coordinate referring to the global short-term light protection score and a y-axis coordinate referring to the long-term light protection score.

FIG. 8 shows a specific presentation of long-term light protection score 14 and global short-term light protection score 26. Each optical product is represented by a point having x-axis and y-axis coordinates. X-axis and y-axis coordinates respectively refer to the global short-term light protection score 26 and the long-term light protection score 14.

This presentation allows to consider both a global view of the light protection level of the optical products as well as each of its components, i.e. the global short-term light protection score 26 and the long-term light protection score 14. Indeed, the diagonal line between the x-axis and the y-axis represents the global light protection score 20. It is therefore possible to first consider the global light protection level (short-term and long-term) of each optical product by considering the position of each optical product with regard to this diagonal line.

In the meantime, each of the global short-term light protection score 26 and the long-term light protection score 14 can still be evaluated independently by only considering the x-axis or the y-axis. This kind of presentation is therefore very useful to optimize the information which is provide to an ECP or a user regarding the light protection level of optical products. The same kind of presentation can be used for different shapes of graphics, while keeping each of the global short-term light protection score 26 and the long-term light protection score 14 associated to different dimensions. For instance, the graphic may comprise bubbles, bar chart, etc.

The present invention also provides an optical product comprising a frame and at least one optical system attached to said frame and intended to face an eye of a user. The optical product is preferably spectacles comprising lenses. Said optical product comprises a data collecting device and a controller configured to perform the evaluating method which is described above Said evaluating method may be a computer-implemented method which can be performed using code instructions from a computer program product or a computer system. The computer system comprises a processor; and a memory with computer code instructions stored thereon. The memory operatively is coupled to the processor such that, when executed by the processor, the computer code instructions cause the computer system to perform the light protection level evaluating method.

The invention claimed is:

1. A method for evaluating at least one light protection level of at least one optical product intended to face an eye of a user and comprising a data collecting device and a controller configured to perform the method, the method comprising the following steps:

determining at least one short-term light protection score representative of at least one short-term light protection attribute of said at least one optical product, said at least one short-term light protection attribute is one among a transmission attribute, a polarization attribute, a stray light attribute and a spectral attribute;

determining at least one long-term light protection score representative of at least one long-term light protection attribute of said at least one optical product, wherein said at least one long-term attribute is a spectral attribute;

determining at least two light environments, said at least two light environments are selected within a group of light environments, said group of light environments comprises at least one among a bright light environment, a day drive environment, a night drive environment, an indoor environment, a screen at night environment, an in-to-out transition environment and an out-to-in transition environment;

selecting said at least one short-term light protection attribute and said at least one long-term light protection attribute respectively among a group of short-term light protection attributes and a group of long-term light protection attributes, depending on said at least two determined light environments; and evaluating at least one light protection level of at least one optical product based on said at least one short-term and at least one long-term protection scores;

wherein the step of evaluating at least one protection level comprises a step of determining at least one global light protection score of said at least one optical product based on said at least one short-term and at least one long-term light protection scores, wherein at least one short-term, at least one long-term and at least one global light protection scores are determined for each determined light environment.

2. The method according to claim 1, wherein said at least one short-term and/or said at least one long-term light protection scores are determined using different weightings for said at least one short-term and said at least one long-term light protection attributes, respectively.

3. The method according to claim 1, further comprising:

determining at least one vision experience score representative of at least one optical product quality attribute of said at least one optical product; and determining at least one global short-term light protection score based on said at least one short-term light protection score and said at least one vision experience score, wherein said at least one light protection level of said at least one optical product is evaluated based on said at least one global short-term light protection score and said at least one long-term light protection score.

4. The method according to claim 3, wherein said at least one optical product quality attribute is one among a transmission attribute, a straylight attribute and a color perception residual attribute.

5. The method according to claim 1, wherein the step of evaluating at least one protection level comprises a step of determining at least one global light protection score of said at least one optical product based on said at least one short-term and at least one long-term light protection scores.

6. The method according to claim 5, further comprising:

determining at least two light environments, wherein at least one short-term, at least one long-term and at least one global light protection scores are determined for each determined light environment.

7. The method according to claim 6, comprising the step of determining a light protection evaluation score based on each global light protection score determined for a determined light environment, wherein said light protection evaluation score is determined using different weightings for said global light protection scores depending on the at least two determined light environments.

8. The method according to claim 5, wherein said global light protection score is determined using different weightings for said at least one global short-term and said at least one long-term light protection scores.

9. The method according to claim 1, further comprising:

determining at least one light protection need of a user; and determining at least one optical product for the user based on said at least one light protection level and said at least one light protection need of the user.

10. The method according to claim 1, further comprising a step of displaying said at least one short-term and said at least one long-term light protection scores onto a same graphic having a first and a second dimensions, said at least one short-term light protection being positioned relative to said first dimension and said at least one long-term light protection being positioned relative to said second dimension.

11. An optical product comprising a frame and at least one optical system attached to said frame and intended to face an eye of a user, said optical product comprising a data collecting device and a controller configured to perform a method for evaluating at least one light protection level of said at least one optical product, the method comprising the following steps:

determining at least one short-term light protection score representative of at least one short-term light protection attribute of said at least one optical product, said at least one short-term light protection attribute is one among a transmission attribute, a polarization attribute, a stray light attribute and a spectral attribute;

determining at least one long-term light protection score representative of at least one long-term light protection attribute of said at least one optical product, wherein said at least one long-term attribute is a spectral attribute;

determining at least two light environments, said at least two light environments are selected within a group of light environments, said group of light environments comprises at least one among a bright light environment, a day drive environment, a night drive environment, an indoor environment, a screen at night environment, an in-to-out transition environment and an out-to-in transition environment;

selecting said at least one short-term light protection attribute and said at least one long-term light protection attribute respectively among a group of short-term light protection attributes and a group of long-term light protection attributes, depending on said at least two determined light environments; and evaluating at least one light protection level of said at least one optical product based on said at least one short-term and at least one long-term protection scores;

wherein the step of evaluating at least one protection level comprises a step of determining at least one global light protection score of said at least one optical product based on said at least one short-term and at least one long-term light protection scores, wherein at least one short-term, at least one long-term and at least one global light protection scores are determined for each determined light environment.

* * * * *